Feb. 3, 1959   K. A. WRIGHT ET AL   2,872,226
STOP COLLAR FOR A WELL PIPE
Filed Dec. 2, 1955   3 Sheets-Sheet 1
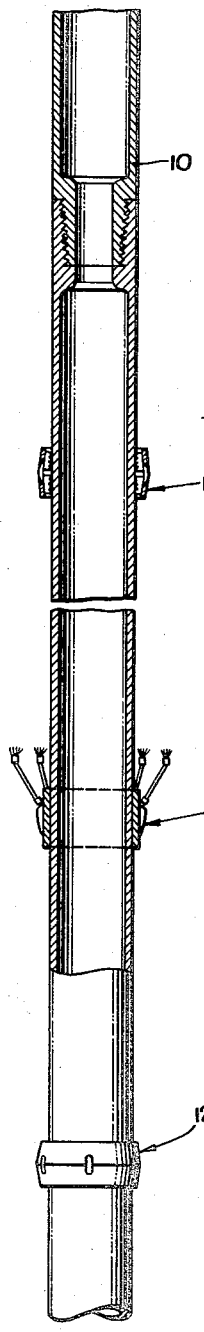
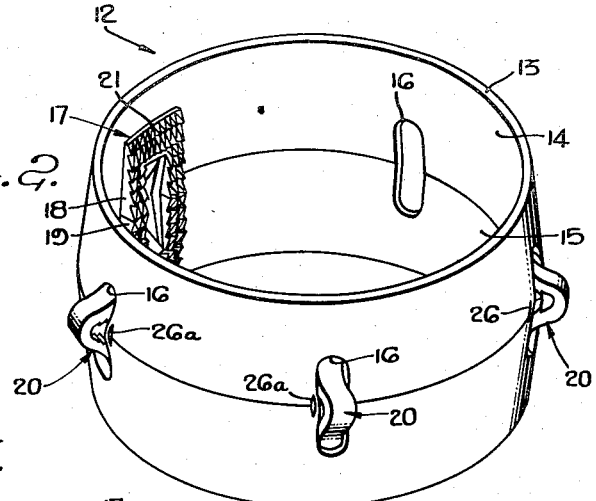
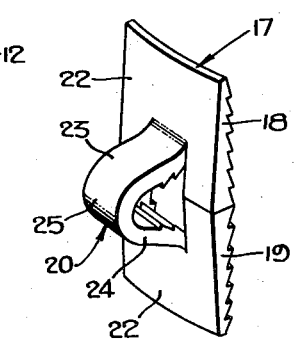
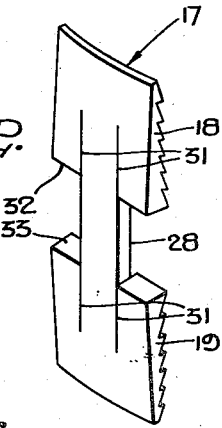
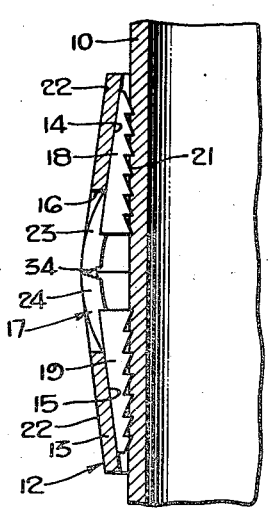
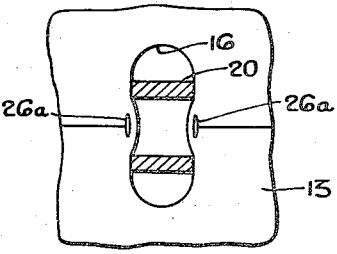
KENNETH A. WRIGHT,
JAMES R. SOLUM,
INVENTORS
BY *Lyon & Lyon*
ATTORNEYS

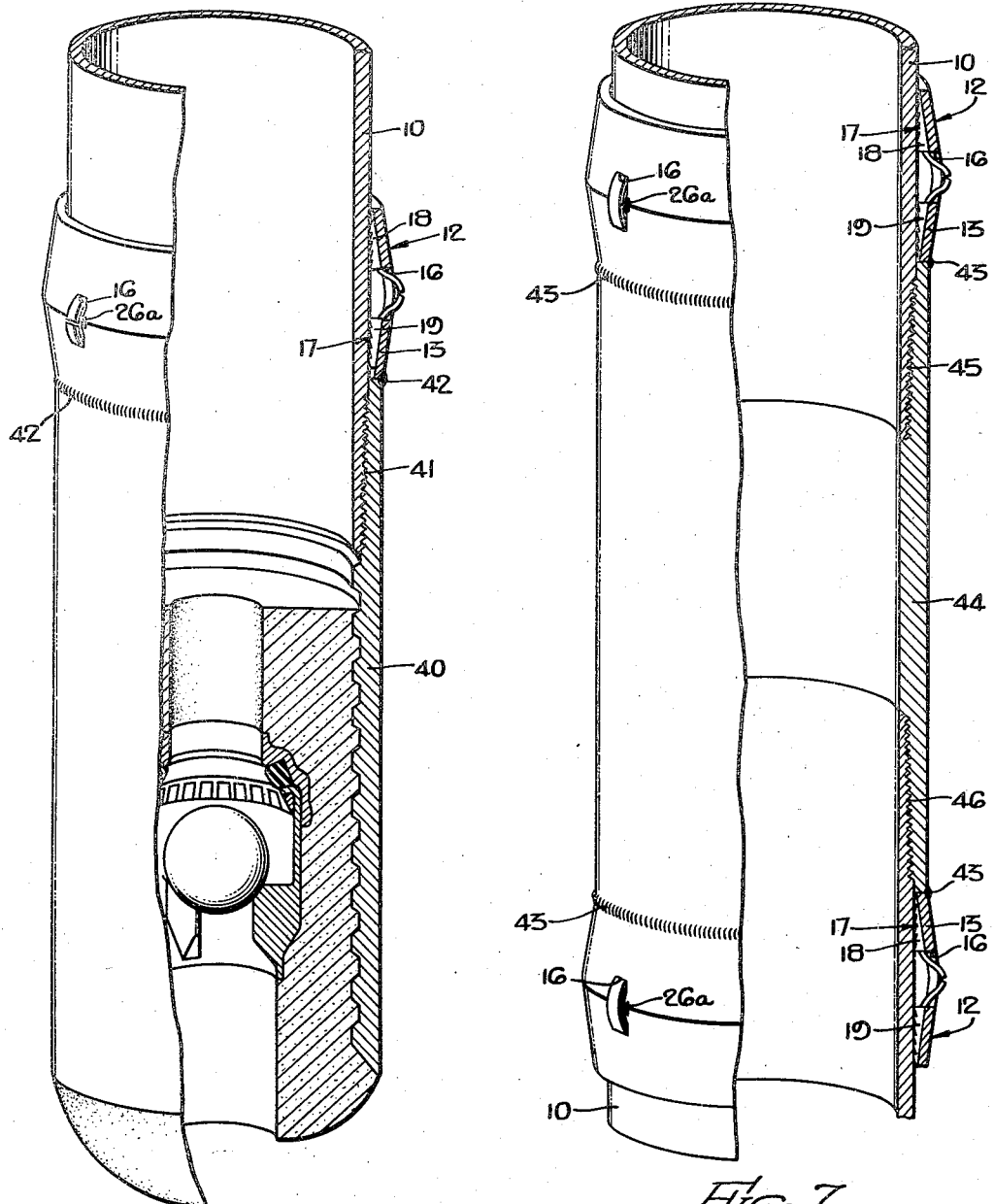

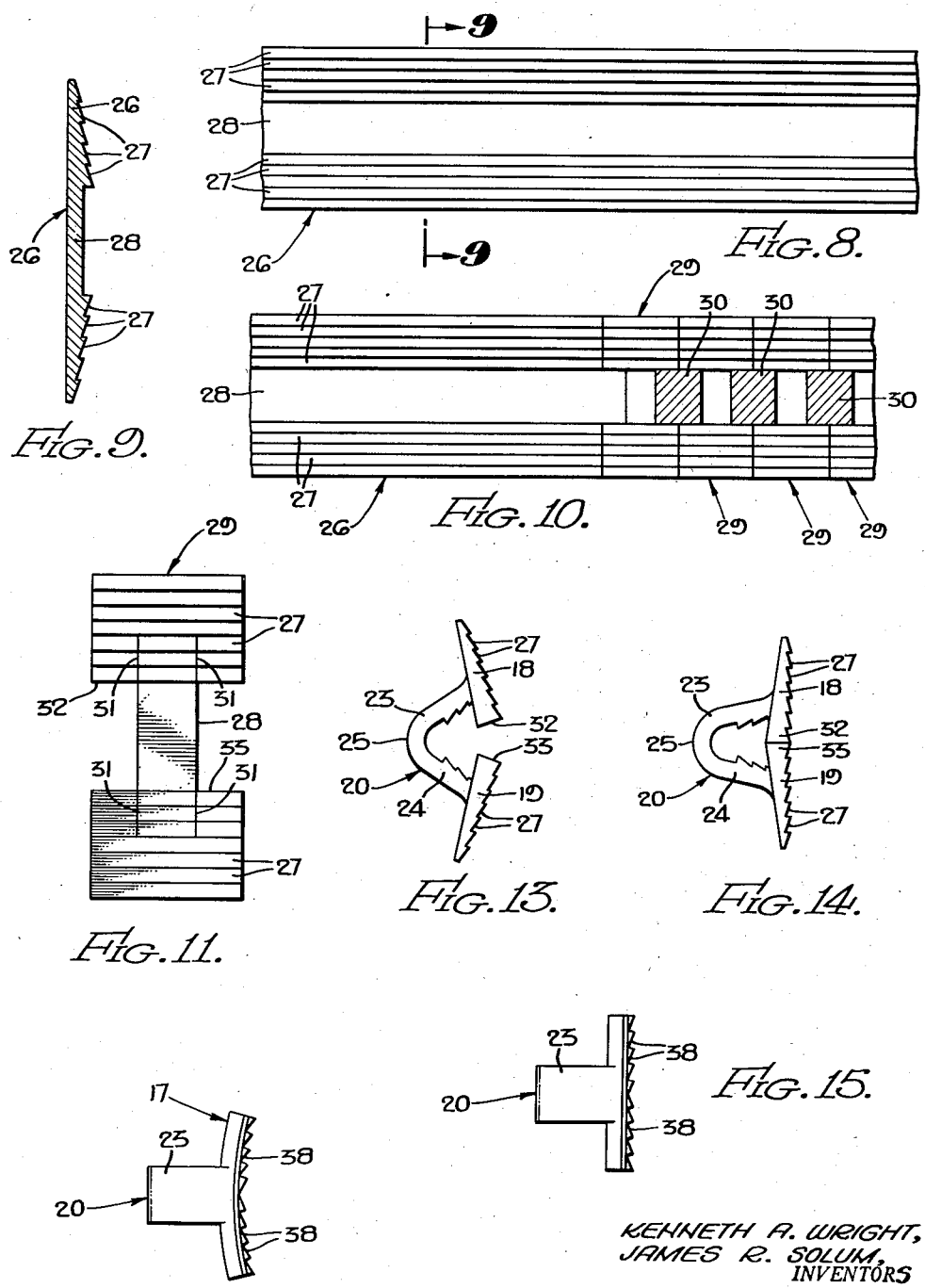

_United States Patent Office_ 2,872,226
Patented Feb. 3, 1959

2,872,226

STOP COLLAR FOR A WELL PIPE

Kenneth A. Wright and James R. Solum, Los Angeles, Calif., assignors to B and W, Inc., Torrance, Calif., a corporation of California Application December 2, 1955, Serial No. 550,597

11 Claims. (Cl. 287—114)

This invention relates to well drilling and production apparatus. It is particularly directed to an improved form of collar which may be mounted on a well pipe by means of wedge devices known as "slips," and without requiring any welding on the well pipe.

This application comprises a continuation-in-part of our co-pending application, Serial No. 502,999, filed April 21, 1955, now abandoned.

It is often desirable to provide stop collars on well pipe in order to limit the movement of devices mounted on the pipe. For example, well scratchers of the type shown in the Wright Patent No. 2,634,813 may be mounted loosely on a well casing. Casing centralizers of the general type shown in the Steps et al. Patent No. 1,775,376 may be similarly mounted. If the casing sections are connected by separate collars, the scratchers or centralizers or other tools are free to move longitudinally on the pipe between the collars which act as limit stops. However, some types of casing do not employ separate connection collars but instead the ends of the casing are threaded directly together, and in such cases the diameter of the casing at the joint is not substantially larger than the remainder of the length of the casing section. Such flush joint casing, therefore, does not have enlargements to act as limit stops for scratchers or centralizers or other tools, and it is often undesirable to attach stop collars by welding them to the pipe. Furthermore, it is often desired to mount stop collars on collared casing or other well pipes at locations between the joint-connecting collars, and without welding, in order to allow the scratcher or other device to travel only a short distance on the pipe.

It is also desirable to employ a collar device which is effective to prevent disassembly of well parts which are connected by threads. For example, it is desirable to provide means for preventing unscrewing movement of the threads which connect a casing shoe to the lowermost section of casing, but without requiring welding on the casing. Also, it is sometimes desirable to prevent unscrewing movement of a collar which serves to connect two adjacent sections of casing and without welding directly to the casing.

It is an object of the present invention to provide a stop collar assembly for use on casing or other well pipes, wherein the collar assembly is anchored in a novel manner on the outer surface of the well pipe by wedge means.

Another object is to provide a stop collar assembly in which wedge means are moved axially into gripping position by means of forces applied radially to the assembly.

Another object is to provide a novel form of wedge means to anchor a stop collar assembly on a well pipe.

Another object is to provide a stop collar assembly which may be frictionally anchored on the casing to prevent turning and which may be welded to an element threadedly connected to the casing.

Another object is to provide such a device which may readily be anchored solidly on the well pipe in a minimum of time and by using only the simplest of tools.

Another object is to provide a device of this type which may be economically manufactured on a quantity basis.

Other and more detailed objects and advantages will appear hereinafter.

In the drawings:

Figure 1 is a side elevation partly in section and partly broken away showing a well pipe having stop collars mounted thereon and showing a well scratcher mounted loosely on the pipe and located between the stop collars.

Figure 2 is a perspective view showing a preferred embodiment of our invention.

Figure 3 is a perspective view showing the construction of one of the wedge elements.

Figure 4 is a sectional view on an enlarged scale, showing the wedge elements in gripping position.

Figure 5 is a fragmentary side view showing deformations in the collar for maintaining the wedge elements in initial retracted position.

Figure 6 is a perspective view partly broken away showing a stop collar assembly in position to anchor a casing shoe against unthreading movement on the casing.

Figure 7 is a perspective view partly broken away showing stop collar assemblies employed for preventing relative rotation between a casing collar and the casing sections which it serves to connect.

Figures 8–16 show steps in constructing the wedge elements. Figure 8 is a plan view showing a strip of metal having longitudinal grooves formed therein.

Figure 9 is a sectional view taken substantially on the lines 9—9 shown in Figure 8.

Figure 10 is a diagram showing how the individual wedge elements are cut from the continuous strip.

Figure 11 is a plan view of one of the wedging elements after lancing of a portion of the wedges thereof.

Figure 12 (Sheet 1) is a perspective view of the wedge element as shown in Figure 11.

Figure 13 shows the shape of the wedge element in an intermediate stage of construction with the web portion deformed.

Figure 14 shows the shape of the wedge element in a later stage of construction with the serrated wedge surfaces in alignment.

Figure 15 shows a plan view of the wedge element following a grooving operation to place longitudinal grooves on the serrated faces.

Figure 16 is a plan view showing the wedge element in final form, with the serrated faces curved to conform to the outer surface of the casing.

Referring to the drawings, the well pipe generally designated 10 may comprise a plurality of casing sections for a well. The sections may be joined by collars, or as shown, may be threaded directly together end-to-end. Well scratchers 11 are loosely mounted upon the pipe 10. Casing centralizers, not shown, may be similarly mounted.

In accordance with this invention, stop collar assemblies 12 are mounted upon the well pipe 10 to limit the extent of axial movement of the well scratchers or casing centralizers. Each of these assemblies employs an annular collar 13 which may comprise a continuous ring, as shown, or may be formed in two semicircular halves joined at their ends by hinge connections. Each collar 13, whether continuous or hinged, has oppositely directed internal conical surfaces 14 and 15. The collar 13 may advantageously be formed of heavy gage sheet metal rolled from flat stock and welded to form a ring. Window openings 16 are punched out or otherwise formed in the stock before rolling, and these window openings 16 are located symmetrically with respect to the internal surfaces 14 and 15.

Wedge members 17 are mounted on the collar 13, and as shown in the drawings, each wedge member comprises a pair of oppositely directed wedge elements 18 and 19 connected by an integral offset web 20. Each wedge element is provided with a serrated front face 21 for engaging the outer surface of the well pipe 10, and is provided with a tapered rear face 22 for engaging one of the surfaces 14 or 15.

The web 20 is narrower than the full width of the wedge elements 18 and 19 and the web extends through one of the window openings 16. Each web 20 is offset rearwardly and each comprises a first leg 23 integrally connected to the wedge element 18, and a second leg 24 integrally connected to the wedge element 19. The legs 23 and 24 form a "dog-leg" angle at the apex 25. Indentations or deformations 26a are formed on the collar 13 in order to reduce the width of the window opening 16 slightly and thereby frictionally retain the wedge members in initial retracted position as shown in Figure 2.

Figures 8–16 show a sequence of steps for constructing the wedge members 17. A flat strip 26 of suitable material, for example, steel, is machined to produce the longitudinal serrations or grooves 27 and to produce the cross-section shape as shown in Figure 9. It will be observed that the center portion 28 is not serrated nor grooved but is substantially thinner than the maximum thickness of the strip after the grooving operation. The individual wedge member blanks 29 are then stamped out of the strip 26 in the manner illustrated in Figure 10, and the only waste is represented by the small rectangular shaded parts 30. The blanks 29 are then lanced along the lines 31, as shown in Figures 11 and 12, to separate the connecting web portion from the wedge elements.

Figures 13 and 14 show how the connecting portion 28 is deformed laterally to produce the web 20 and how the wedge elements 18 and 19 are brought into alignment with their heel edges 32 and 33 in abutting relationship. At this stage of construction, the serrations 27 are the only serrations on the gripping faces of the wedge elements. Additional grooves or serrations 38 are then cut into the gripping faces and these serrations 38 extend at right angles to the direction of the serrations 27. The resulting teeth which are formed by these two series of serrations at right angles are best shown in perspective in Figure 2. It will be observed that the serrations 27 on the upper wedge element 18 incline downwardly while the serrations on the lower wedge element 19 incline upwardly. In a similar fashion, the serrations 38 on one side of the gripping surface incline in one direction and incline in the opposite direction on the other side of the surface, as shown in Figure 15. The curved shape shown in Figure 16 may be produced by forming in a die and this step may be taken either before or after cutting of the serrations 38.

After the wedge members 17 are fully shaped, as shown in Figures 3 and 16, they are preferably subjected to a hardening operation such as, for example, nitriting, to produce a hard surface or skin on the teeth formed by the serrations 27 and 38. The entire part 17 is nitrited with the result that the outer surface of the web 20 is also hardened.

After the completed members 17 have been installed on the collar 13, the assembly 12 is applied to the well pipe by sliding it axially over one end of a pipe section to the desired location. Hammer blows are then applied to each projecting web 20 and this has the effect of straightening out the "dog-leg" angle, thereby moving the wedge elements 18 and 19 axially in opposite directions into gripping position, as shown in Figure 4. Because of the skin hardness of the outer surfaces of the web 20, the web may actually be fractured at 34 by the hammering operation, but this is beneficial since it prevents any action of one of the wedge elements 18 or 19 from applying a tension force to release the gripping action of the other wedge element. The parts are so proportioned that the wedge elements 18 and 19 reach full gripping position at approximately the same time as the web apex 25 becomes flush with the outside surface of the collar 13. The collar is then solidly anchored on the outer surface of the well pipe 10, with the serrations 27 and 38 biting into the pipe surface. The serrations 27 prevent axial movement of the collar 13 and the serrations 38 prevent rotary movement thereof. The collar assembly 12, therefore, may serve as a stop to limit axial movement of well scratchers, casing centralizers or other tools with respect to the pipe 10. Axial forces applied to the collar 13 in either direction do not cause it to slip along the pipe surface, but on the contrary, serve only to wedge the collar more securely in place.

In Figure 6, the collar assembly 12 is employed to prevent relative rotation between the casing 10 and the cement shoe 40. The threads 41 connect the shoe 40 to the casing 10 and the collar assembly 12 prevents a relative movement along these threads. The collar 13 is fixed to the shoe 40 by means of weld metal 42. When the interior parts of the casing shoe are drilled out after the cementing operation is completed, the loads so applied to the shoe 40 cannot result in unscrewing of the shoe from the lower end of the casing 10.

The collar assemblies 12 shown in Figure 7 are connected by weld metal 43 to opposite ends of the casing collar 44 which serves to join adjacent sections of the casing 10. These collar assemblies 12 prevent unscrewing motion on the threads 45 or 46.

It will be noted that no welding directly to the casing 10 is required in either Figure 6 or Figure 7.

Having fully described our invention, it is to be understood that we do not wish to be limited to the details herein set forth but our invention is of the full scope of the appended claims.

We claim:

1. In a stop collar assembly for installation upon a well pipe, the combination of: a collar having an annular wall provided with two oppositely tapered surfaces on the interior thereof, the wall having a plurality of window openings extending therethrough and symmetrically located with respect to said surfaces, a plurality of members each having two wedge elements connected by an integral offset web, each wedge element having one portion for engaging one of the said tapered surfaces and having another portion for contacting the well pipe, the offset webs protruding through said window openings, whereby said wedge elements may be moved away from each other along said tapered surfaces by applying a force against said offset webs, and thereby anchor the collar upon the well pipe, and retainer means engaging the offset webs for initially retaining the wedge elements in position.

2. In a stop collar assembly for installation upon a well pipe, the combination of: a collar having an annular wall provided with two oppositely tapered surfaces on the interior thereof, the wall having a plurality of window openings extending therethrough and symmetrically located with respect to said surfaces, a plurality of members each having two wedge elements connected by an integral offset web, each wedge element having one portion for engaging one of the said tapered surfaces and having another portion for contacting the well pipe, the offset webs protruding through said window opening, whereby said wedge elements may be moved away from each other along said tapered surfaces by applying a force against said offset webs, and thereby anchor the collar upon the well pipe, and laterally projecting means on said collar for initially retaining the wedge elements in position.

3. A one-piece wedge member having a pair of similar wedge elements, each wedge element having a rear tapered face and front serrated face, a web connecting said wedge elements so that their big ends are adjacent and their small ends are remote, the web comprising a first leg integrally joined to one wedge element and a second leg integrally joined to the other wedge element, the legs each projecting rearwardly at an angle and being integrally joined together at an apex.

4. A one-piece wedge member having a pair of similar wedge elements, each wedge element having a rear tapered face and front serrated face, a web connecting said wedge elements so that their big ends are adjacent and their small ends are remote, the web having a rearwardly projecting dog-leg angle therein.

5. A one-piece wedge member having a pair of similar wedge elements, each wedge element having a rear tapered face and front serrated face, a web connecting said wedge elements so that their big ends are adjacent and their small ends are remote, the web comprising a first leg integrally joined to one wedge element and a second leg integrally joined to the other wedge element, the legs of the web being narrower than the width of the wedge elements, the legs each projecting rearwardly at an angle and being integrally joined together at an apex.

6. The device set forth in claim 5 in which the web is thinner than the big ends of the wedge elements.

7. The device set forth in claim 5 in which each leg of the web joins its respective wedge element at a location between the big end and small end thereof.

8. The device set forth in claim 5 in which each serrated face is formed by intersecting grooves extending both longitudinally and laterally.

9. For use with a member threadedly connected to a well pipe, a stop collar assembly having an annular wall provided with two oppositely tapered surfaces on the interior thereof, the wall having a plurality of window openings extending therethrough, a plurality of wedge members each having two oppositely directed wedge elements each engaging one of the said tapered surfaces, respectively, each wedge member also including a deformable part attached to the wedge elements and extending into a window opening, weld means fixing the annular wall to the said threaded member, the wedge members engaging the outer surface of the well pipe to fix the stop collar assembly thereto and thereby prevent relative motion between the well pipe and the threaded member.

10. The device set forth in claim 9 in which the wedge elements have pipe-engaging surfaces provided with axially extending serrations.

11. The device set forth in claim 9 in which the wedge elements have pipe-engaging surfaces provided with intersecting serrations extending both axially and circumferentially.

References Cited in the file of this patent

UNITED STATES PATENTS

| | | |
|---|---|---|
| 465,202 | Preston | Dec. 15, 1881 |
| 1,997,649 | Ohlund | Apr. 16, 1935 |
| 2,454,557 | Jacobson | Nov. 23, 1948 |
| 2,499,104 | Lovell | Feb. 28, 1950 |
| 2,546,582 | Baker | Mar. 27, 1951 |
| 2,636,564 | Kluck | Apr. 28, 1953 |
| 2,718,266 | Berry et al. | Sept. 20, 1955 |
| 2,801,700 | Hall | Aug. 6, 1957 |